(12) United States Patent
Scarborough et al.

(10) Patent No.: US 7,472,097 B1
(45) Date of Patent: Dec. 30, 2008

(54) EMPLOYEE SELECTION VIA MULTIPLE NEURAL NETWORKS

(75) Inventors: David J. Scarborough, West Linn, OR (US); Bjorn Chambless, Portland, OR (US); Anne Thissen-Roe, Vancouver, WA (US)

(73) Assignee: Kronos Talent Management Inc., Beaverton, OR (US)

( * ) Notice: Subject to any disclaimer, the term of this patent is extended or adjusted under 35 U.S.C. 154(b) by 113 days.

(21) Appl. No.: 11/386,067

(22) Filed: Mar. 20, 2006

Related U.S. Application Data

(60) Provisional application No. 60/665,102, filed on Mar. 23, 2005.

(51) Int. Cl.
G06E 1/00 (2006.01)
G06E 3/00 (2006.01)
G06F 15/18 (2006.01)
G06G 7/00 (2006.01)

(52) U.S. Cl. ...................................... 706/26
(58) Field of Classification Search ....................... None
See application file for complete search history.

(56) References Cited

U.S. PATENT DOCUMENTS

| | | | | |
|---|---|---|---|---|
| 5,325,862 A | * | 7/1994 | Lewis et al. ............... | 600/544 |
| 5,408,588 A | * | 4/1995 | Ulug ........................ | 706/25 |
| 5,467,428 A | * | 11/1995 | Ulug ........................ | 706/25 |
| 5,551,880 A | | 9/1996 | Bonnstetter et al. | |
| 6,405,159 B2 | * | 6/2002 | Bushey et al. .............. | 703/13 |
| 6,795,799 B2 | * | 9/2004 | Deb et al. .................. | 702/188 |
| 6,853,966 B2 | * | 2/2005 | Bushey et al. .............. | 703/13 |
| 7,080,057 B2 | * | 7/2006 | Scarborough et al. ....... | 706/60 |
| 7,161,705 B2 | * | 1/2007 | Klassen .................... | 358/1.18 |
| 7,310,626 B2 | * | 12/2007 | Scarborough et al. ....... | 706/60 |
| 7,356,484 B2 | * | 4/2008 | Benjamin et al. ........... | 705/11 |
| 7,383,241 B2 | * | 6/2008 | Velipasaoglu et al. ....... | 706/47 |
| 2002/0042786 A1 | | 4/2002 | Scarborough et al. | |
| 2003/0191680 A1 | * | 10/2003 | Dewar ....................... | 705/8 |
| 2005/0114279 A1 | | 5/2005 | Scarborough et al. | |
| 2005/0246299 A1 | | 11/2005 | Scarborough et al. | |

OTHER PUBLICATIONS

A measurement-based model to predict the performance impact of system modifications: a case study Dimpsey, R.T.; Iyer, R.K.; Parallel and Distributed Systems, IEEE Transactions on vol. 6, Issue 1, Jan. 1995 pp. 28-40 Digital Object Identifier 10.1109/71.363413.*

(Continued)

*Primary Examiner*—Michael B Holmes
(74) *Attorney, Agent, or Firm*—Klarquist Sparkman, LLP

(57) ABSTRACT

A plurality of neural networks or other models can be used in employee selection technologies. A hiring recommendation can be based at least on processing performed by a plurality of neural networks. For example, parallel or series processing by neural networks can be performed. A neural network can be coupled to one or more other neural networks. A binary or other n-ary output can be generated by one or more of the neural networks. In a series arrangement, candidates can be processed sequentially in multiple stages, and those surviving the stages are recommended for hire.

31 Claims, 11 Drawing Sheets

OTHER PUBLICATIONS

P-O Fit as an Alternative Predictor of Employee Service Performance: Do Shared Cognitions Matter? Xiaoyun Xie; Jin Yan; Wireless Communications, Networking and Mobile Computing, 2007. WiCom 2007. International Conference on Sep. 21-25, 2007 pp. 6564-6567 Digital Object Identifier 10.1109/WICOM.2007.1611.*

The design and development of a sales force automation tool using business process management software Baysan, C.; Bertman, A.; Maynigo, R.; Norville, G.; Osborne, N.; Taylor, T.; Systems and Information Engineering Design Symposium, 2005 IEEE Apr. 29, 2005 pp. 318-327.*

Career progression in a Fortune 500 company: examination of the "glass ceiling" Tokunaga, H.; Graham, T.; Engineering Management, IEEE Transactions on vol. 43, Issue 3, Aug. 1996 pp. 262-272 Digital Object Identifier 10.1109/17.511837.*

Reengineering training for performance improvement Kulonda, D.J.; Management of Engineering and Technology, 1999. Technology and Innovation Management. PICMET '99. Portland International Conference on vol. 1, Jul. 25-29, 1999 pp. 333-334 vol. 1 Digital Object Identifier 10.1109/PICMET.1999.808330.*

Bartholomew, D.J., "Note on the Measurement and Predication of Labour Turnover," Journal of the Royal Statistical Society. Series A (General), vol. 122, No. 2, 1959, pp. 232-239, 8 pages.

Roverso, "Dynamic Empirical Modelling Techniques for Equipment and Process Diagnostics in Nuclear Power Plants," IFE—Institute for Energy Technology, OECD Halden Reactor Project, IAEA Technical Meeting, Jun. 2005, 37 pages.

Scarborough, "An Evaluation of Backpropagation Neural Network Modeling as an Alternative Methodology for Criterion Validation of Employee Selection Testing," UMI Dissertation Services (1995) Part 1 of 3, 60 pages.

Scarborough, "An Evaluation of Backpropagation Neural Network Modeling as an Alternative Methodology for Criterion Validation of Employee Selection Testing," UMI Dissertation Services (1995) Part 2 of 3, 56 pages.

Scarborough, "An Evaluation of Backpropagation Neural Network Modeling as an Alternative Methodology for Criterion Validation of Employee Selection Testing," UMI Dissertation Services (1995) Part 3 of 3, 64 pages.

* cited by examiner

A radial basis function neural network trained to classify good from bad employees using employment application and psychological assessment data.

EMPLOYEE SELECTION VIA MULTIPLE NEURAL NETWORKS

CROSS-REFERENCE TO RELATED APPLICATIONS

This application claims the benefit of U.S. Provisional Patent Application No. 60/665,102 to Scarborough, entitled "Employee Selection via Multiple Neural Networks," filed Mar. 23, 2005, which is hereby incorporated herein by reference.

TECHNICAL FIELD

The technical field relates to automated candidate employee selection via computer software.

BACKGROUND

Despite advances in technology, the process of finding and hiring employees is still time consuming and expensive. Because so much time and effort is involved, businesses find themselves devoting a considerable portion of their resources to the task of hiring. Some companies have entire departments devoted to finding new hires, and most have at least one person, such as a recruiter or hiring manager, who coordinates hiring efforts. However, even a skilled recruiter with ample available resources may find the challenge of finding suitable employees daunting.

Although automated systems exist for collecting job applications and selecting employees, the reliability and usefulness of such systems is sometimes questionable. Therefore, providing a meaningful, reliable, and useful hiring recommendation still remains a challenge.

SUMMARY

Various technologies described herein relate to employee selection via neural network technologies. For example, a hiring recommendation can be based on processing performed by two or more neural networks or other models.

Processing can be performed in multiple stages. Those candidates surviving the stages can be recommended for hire.

An n-ary output can indicate whether to hire a candidate employee. Consensus groups can be used.

The neural networks can indicate any of a variety of predictions for a candidate employee. For example, a network can indicate whether the employee is predicted to be involuntarily terminated, whether the employee is predicted to have a length of service exceeding a threshold, and the like.

Additional features and advantages of the various embodiments will be made apparent from the following detailed description of illustrated embodiments, which proceeds with reference to the accompanying drawings.

The technologies include the novel and nonobvious features, method steps, and acts, alone and in various combinations and sub-combinations with one another as set forth in the claims below. The present invention is not limited to a particular combination or sub-combination thereof. Technology from one or more of any of the examples can be incorporated into any of the other examples.

DETAILED DESCRIPTION OF EXEMPLARY EMBODIMENTS

Example 1

Exemplary System

Figure 1:
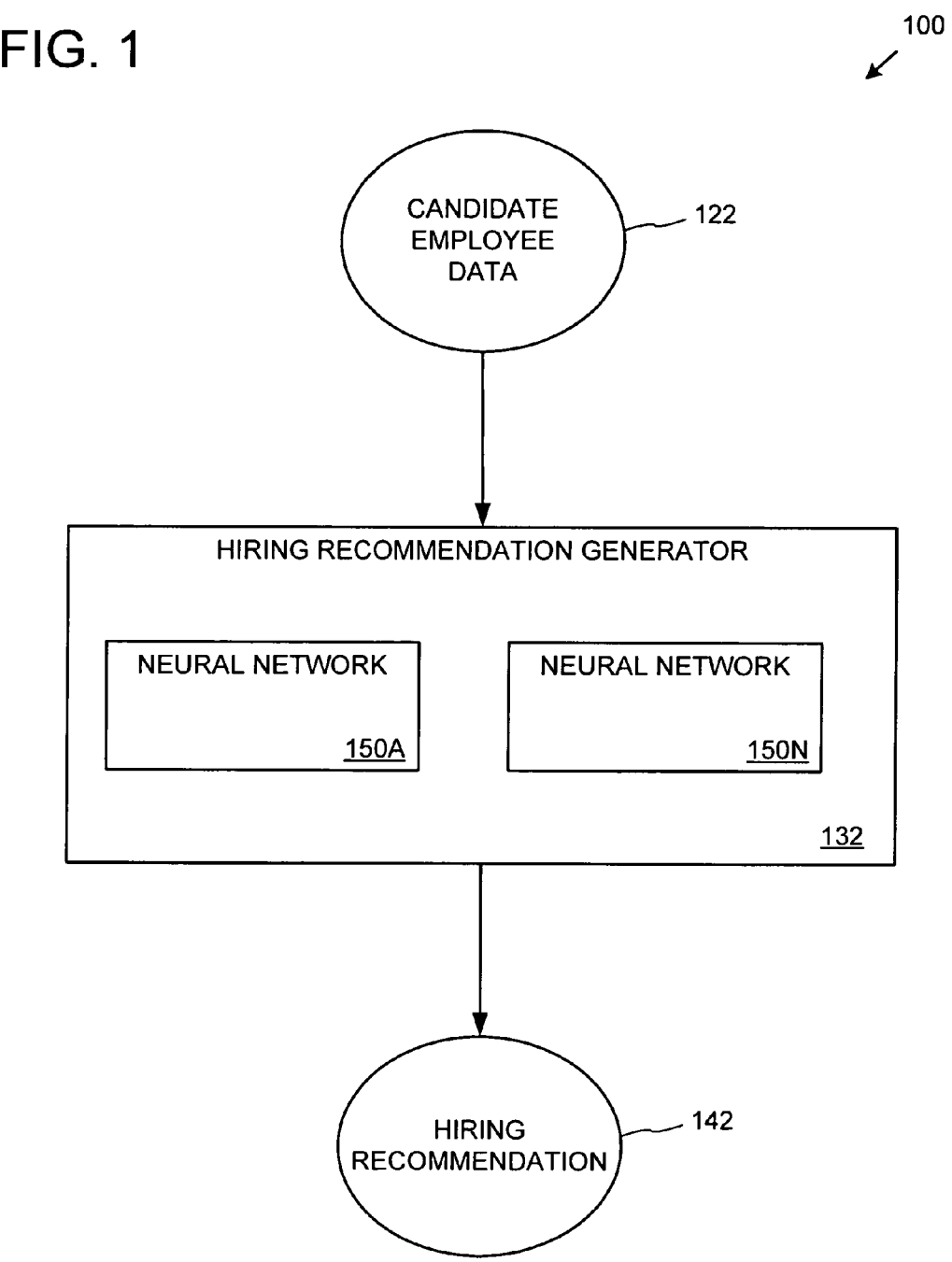
FIG. 1 is a block diagram showing an exemplary employee selection system comprising multiple neural networks.

FIG. 1 shows an exemplary employee selection system 100 comprising two or more neural networks 150A and 150N. In the example, a hiring recommendation generator 132 accepts candidate employee data 122 for a candidate employee as input, and generates a hiring recommendation 142 as output. In practice, data for one or more candidates can be accepted to generate one or more respective hiring recommendations.

Example 2

Exemplary Interpretive Engine

In any of the examples described herein, a hiring recommendation interpretive engine can be included to translate outputs (e.g., of the neural networks or a hiring recommendation estimator comprising the neural networks) into a human-readable (e.g., human-friendly) output. For example, the neural networks can be part of a hiring recommendation estimator, which feeds one or more outputs to a hiring recommendation interpretive engine.

Example 3

Exemplary Method

Figure 2:
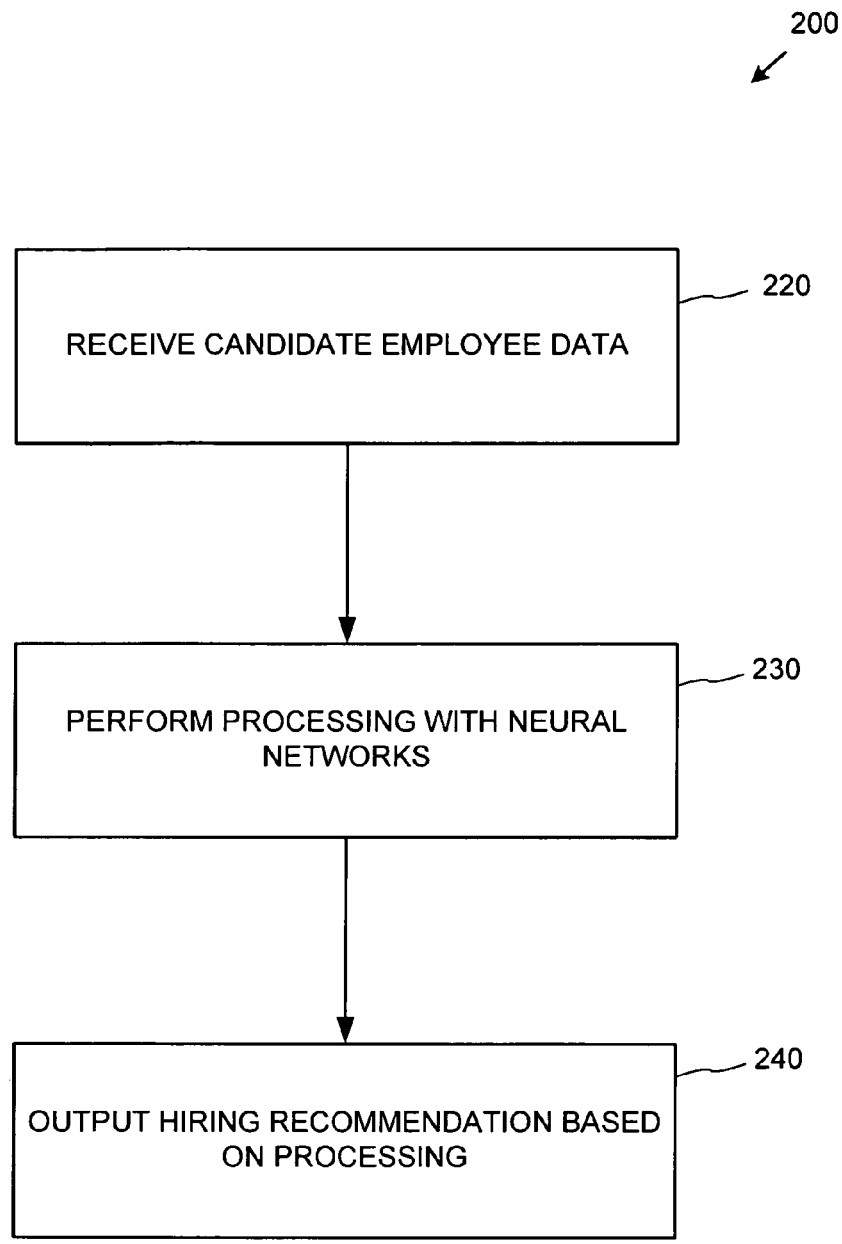
FIG. 2 is a flowchart showing an exemplary employee selection method comprising processing via multiple neural networks.

FIG. 2 shows an exemplary method 200 for selecting employees and can be performed, for example, by a system such as that shown in FIG. 1. At 220, candidate employee data is received. At 230, processing is performed by at least a first and a second neural network. At 220, a hiring recommendation is generated based on the candidate employee data. The hiring recommendation can be based at least on the processing performed by (e.g., the outputs of) the first and second neural networks. For example, the candidate employee data can be used as input to at least one of the neural networks, and the hiring recommendation can be based on the output of the neural networks.

Example 4

Exemplary Hiring Recommendation

In any of the examples described herein, a hiring recommendation can take a variety of forms. For example, a hiring recommendation can include an n-ary value indicating whether to hire a candidate employee. Such an n-ary value can be a binary value (e.g., a binary value indicating "yes" or "no"; a binary value indicating "hire" or "do not hire"; or a binary value indicating "pass" or "fail") or have more than two values (e.g., "yes," "no," "maybe"; "strong yes," "no," "strong no"; "green," "yellow," "red"; or the like).

Other information can be included, such as values (e.g., one or more predicted job performance outcomes) predicted by one or more of the neural networks. In this way, a report can provide meaningful information appropriate for determining whether to select the candidate employee.

In practice, the hiring recommendation can be included as part of a hiring recommendation report, which can be provided (e.g., to a decision maker or a hiring manager) in a variety of ways (e.g., on a web page, in an email, or in a printed report). If desired, candidate employees can be ranked in a list based on one or more criteria.

Example 5

Exemplary Neuro-Fuzzy Network

In any of the examples described herein, a neuro-fuzzy network can be used in place of, or in addition to, or in combination with, a neural network.

Example 6

Exemplary Candidate Employee Data

In any of the examples described herein, candidate employee data can comprise any of a variety of information obtainable in a variety of ways. For example, candidate employee data can comprise one or more job performance predictive values: any value that can be used to predict job performance. A job performance predictive value can comprise any independent variable that can be used to predict (e.g., in a predictive equation or model) one or more job performance outcomes. In any of the examples described herein, a hiring recommendation can be based at least on such job performance predictive values.

Job performance predictive values can comprise answers to employment applications (e.g., electronic applications comprising questionnaires) completed by candidate employees, candidate employee test results (e.g., over the Internet, in person, or the like), or some combination thereof. Any value that can be reduced to measurable form (e.g., numerical, categorical, ranking) can be used as a job performance predictive value.

Example 7

Exemplary Input of Neural Network

In any of examples herein, any of the neural networks can accept any of the exemplary candidate employee data as input. For example, job performance predictive values or a subset thereof can be used as input to a neural network. Processing by the neural network can be performed according to the input.

In the case of more than one neural network, each can accept different inputs (e.g., the inputs appropriate for the neural network as determined during development).

Example 8

Exemplary Output of Neural Network

In any of the examples herein, a neural network can be constructed so that it generates any of a variety of outputs. For example, a neural network can output a continuous variable, a ranking, an integer, an n-ary (e.g., binary, ternary, or the like) variable (e.g., indicating membership in a category), probability (e.g., of membership of a group), percentage, or the like. Such outputs are sometimes called bi-valent, multi-valent, dichotomous, nominal, and the like.

The output of the neural network is sometimes called a "prediction" because the neural network effectively predicts a job performance outcome for the candidate employee if the candidate employee were to be hired. Any of a variety of outcome variables can be predicted. For example, performance ratings by managers, performance ratings by customers, productivity measures, units produced, sales (e.g., dollar sales per hour, warrantee sales), call time, length of service, promotions, salary increases, probationary survival, theft, completion of training programs, accident rates, number of disciplinary incidents, number of absences, whether an applicant will be involuntarily terminated, and the like can be predicted.

Neural networks are not limited to the described outputs. Any post-employment behavior (e.g., job performance measurement or outcome) that can be reliably measured (e.g., reduced to a numeric measurement) can be predicted (e.g., estimated) by a neural network for a candidate employee. It is anticipated that additional job performance measurements will be developed in the future, and these can be embraced by the technologies described herein.

The output of a neural network can be tailored to generate a particular type of variable. For example, an integer or continuous variable can be converted to a binary or other n-ary value via one or more thresholds.

Example 9

Exemplary Processing in Parallel

Figure 3:
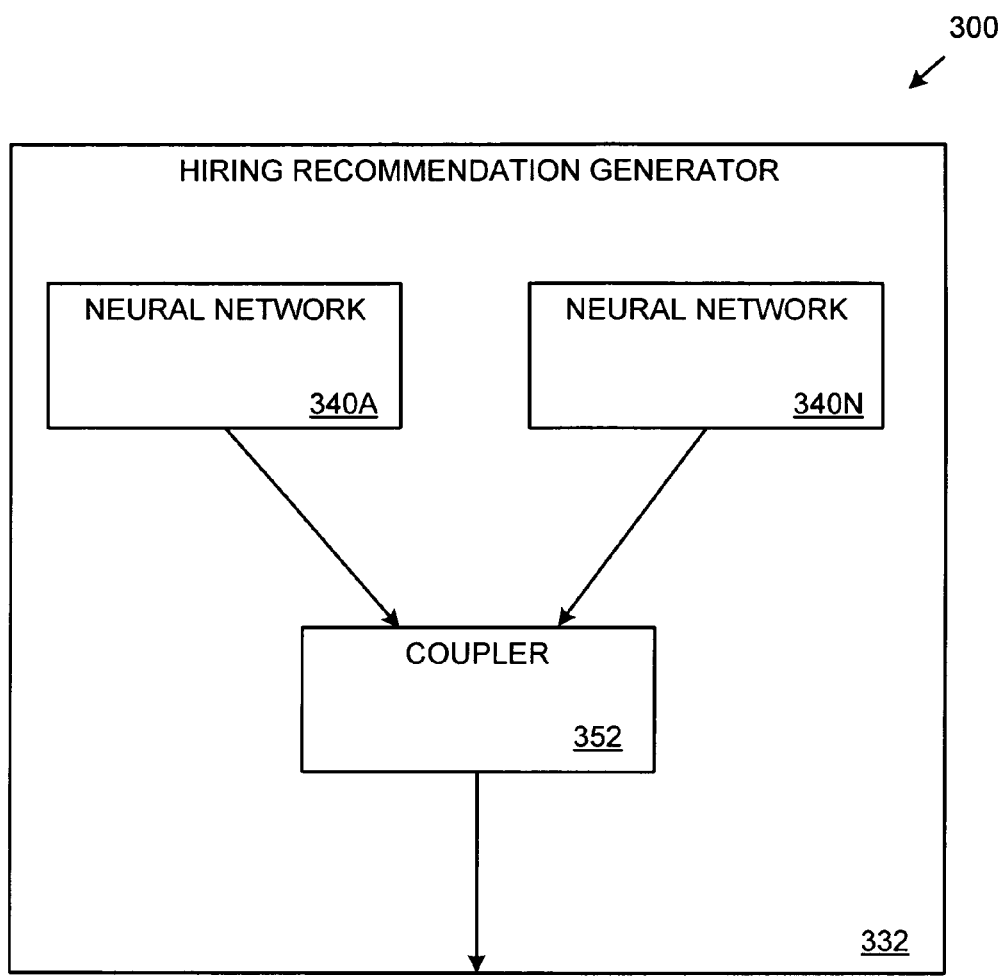
FIG. 3 is a block diagram showing an exemplary hiring recommendation generator comprising two neural networks in a parallel arrangement and a coupler.

FIG. 3 shows an exemplary system 300 comprising an exemplary recommendation generator 332 comprising at least two neural networks 340A and 340N. In the example, the processing is performed in parallel, and results are fed to a coupler 352, which can generate a hiring recommendation based at least on the outputs of the two neural networks 340A and 340N.

Figure 4:
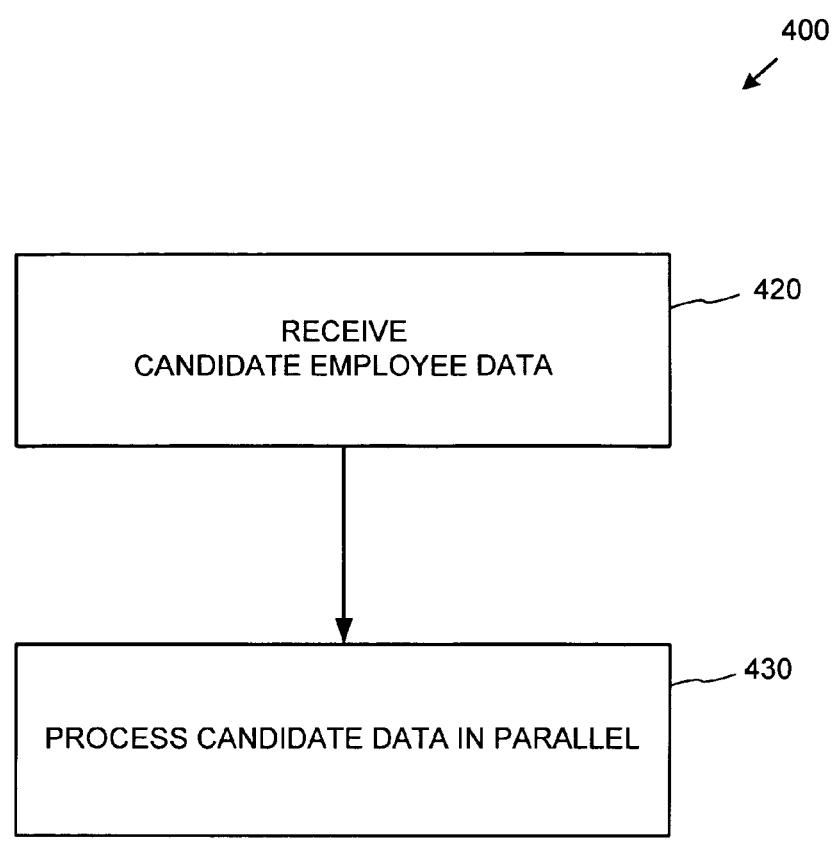
FIG. 4 is a flowchart showing an exemplary employee selection method comprising parallel neural network processing.

FIG. 4 shows an exemplary employee selection method 400 that uses parallel processing by neural networks and can be performed, for example, by a system such as that shown in FIG. 3. At 420, candidate employee data is received. At 430 candidate employee data is processed in parallel by at least two neural networks. A hiring recommendation can then be generated based at least on the processing.

The two networks can predict different outcome variables. However, in any of the parallel arrangements, a consensus group can be used. In a consensus group, more than one neural network can predict the same outcome. A final outcome can be determined by voting, averaging, or the like.

Example 10

Exemplary Processing in Series

Figure 5:
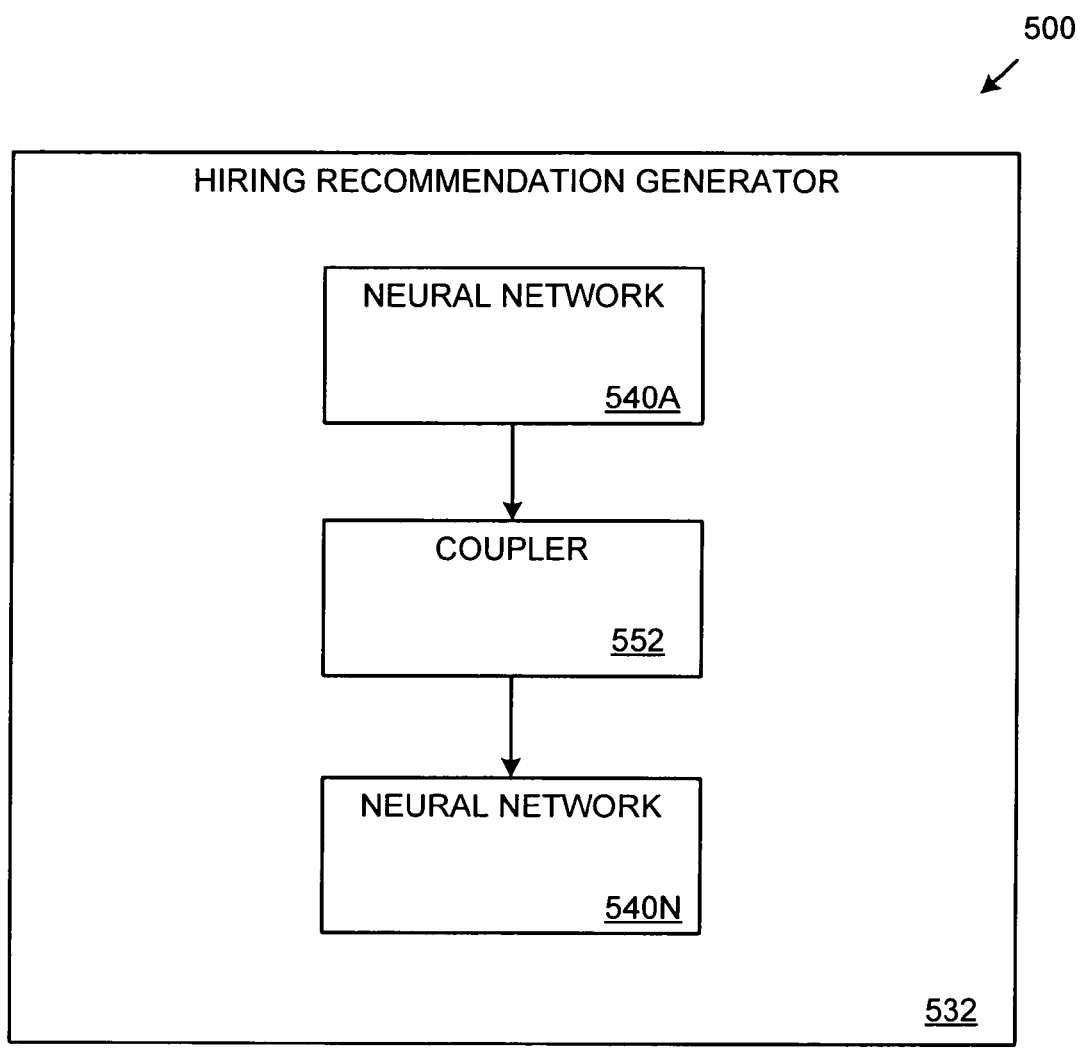
FIG. 5 is a block diagram showing an exemplary hiring recommendation generator comprising two neural networks and a coupler in a series arrangement.

FIG. 5 shows an exemplary system 500 comprising an exemplary recommendation generator 532 comprising at least two neural networks 540A and 540N. In the example, the processing is performed in series (e.g., sequentially or seriatim), and results are fed to a coupler 552, before feeding to at least one of the neural networks. The coupler 552 can make decisions (e.g., whether to continue processing) based on the output of the neural network 540A. The generator 532 can include further logic that generates a hiring recommendation based at least on the outputs of the two neural networks 540A and 540N.

Figure 6:
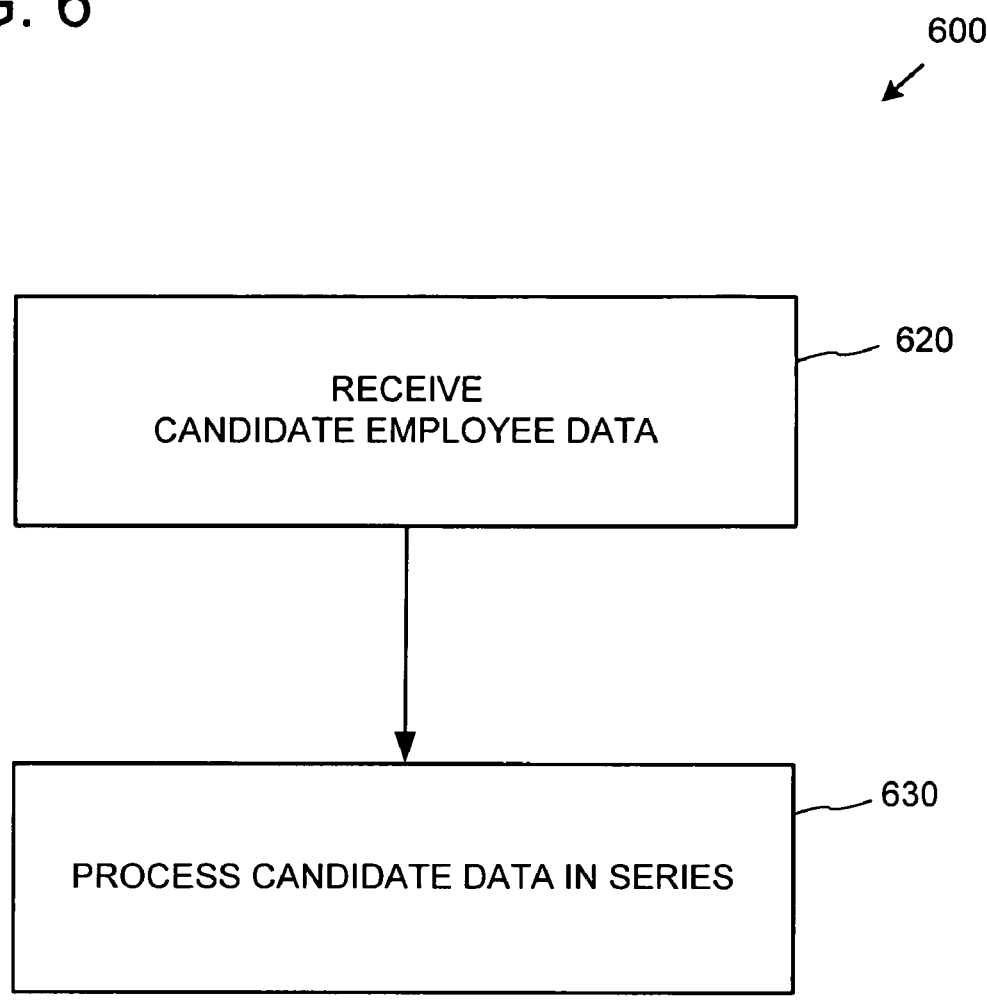
FIG. 6 is a flowchart showing an exemplary employee selection method comprising neural network processing in series.

FIG. 6 shows an exemplary employee selection method 600 that uses processing in series by neural networks and can be performed, for example, by a system such as that shown in FIG. 5. At 620, candidate employee data is received. At 630 candidate employee data is processed in series by at least two neural networks. A hiring recommendation can then be generated based at least on the processing.

Example 11

Exemplary Coupler

In any of the examples described herein, a coupler can couple two or more neural networks. A coupler can include any set of instructions (e.g., a software module, procedure, or the like) that processes neural network outputs. Couplers can take a variety of actions in response to evaluation of one or more neural network outputs (e.g., decide whether input is to be sent to another neural network, combine outputs for use in a hiring recommendation, or to feed neural network outputs to a hiring recommendation generator or interpretive engine).

Example 12

Exemplary Multi-Stage Techniques

In any of the examples described herein, a multi-stage technique can be applied. For example, in scenarios involving serial or sequential processing, the neural networks can be in two or more respective stages (e.g., a first stage, a second stage, etc.). The neural networks in different stages can predict different job performance outcomes.

If desired, an unfavorable outcome at one stage can block a candidate from processing in subsequent stages. Processing for subsequent stages can be performed responsive to determining that the candidate has survived one or more earlier stages.

A favorable hiring recommendation (e.g., "hire," "pass," or "yes") can be provided for a candidate who survives the stages. For example, a coupler can decide whether a candidate employee has survived a particular stage and decide whether to continue neural network processing. A system can be configured so that failure at any of the stages knocks the candidate employee out from further consideration by other neural networks.

Example 13

Exemplary Method of Basing a Hiring Recommendation on Processing by Plural Neural Networks Basing the hiring recommendation on processing by plural neural networks can include basing the hiring recommendation on one or more outputs of the neural network. For example, the technology can be configured so that the neural networks vote on the output. Any of a variety of techniques can be used to determine the outcome of voting (e.g., majority, plurality, two-thirds voting, and the like).

Further, the technology can be configured so that any of the neural networks can exercise veto power over an n-ary (e.g., binary) value. In other words, a neural network can indicate that the value should be "no" regardless of what the other neural networks indicate.

Example 14

Exemplary Neural Network with n-ary Output

Figure 7A:
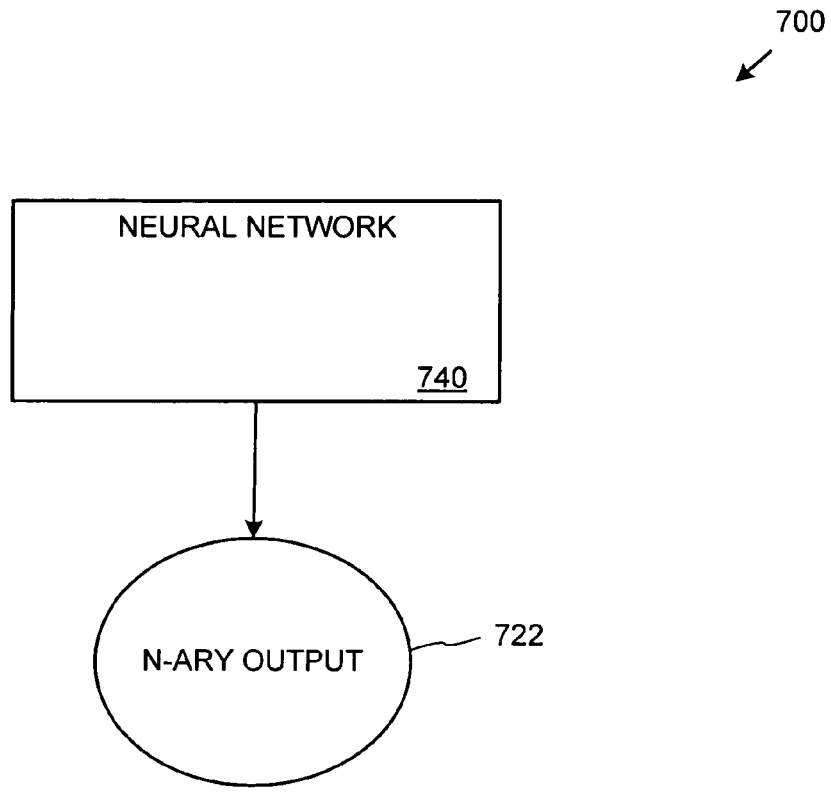
FIG. 7A is a block diagram showing a neural network having an n-ary output.

FIG. 7A shows an exemplary neural network 740 that generates at least one n-ary output 722. In any of the examples described herein, a neural network can have an n-ary output. For example, a neural network can have a binary, ternary, etc. output. In such a case, the output can be based on a mapping, range, threshold, or the like of an intermediary output.

Example 15

Exemplary Prediction Engine

Figure 7B:
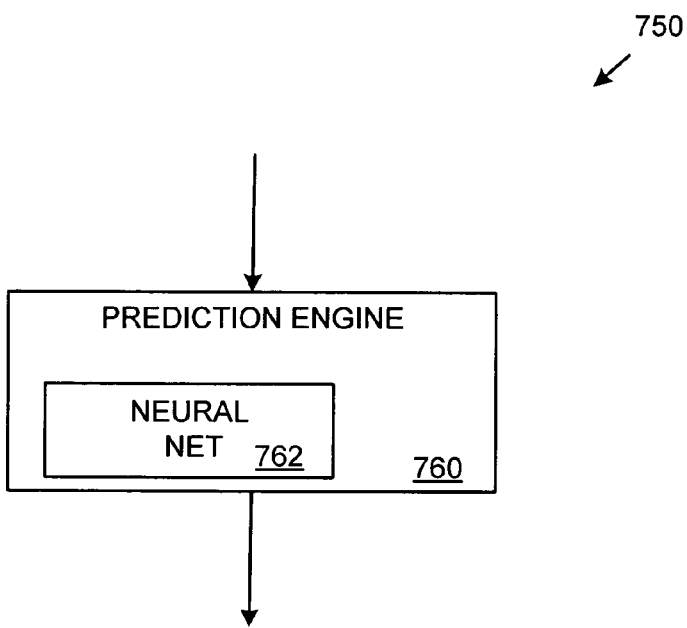
FIG. 7B is a block diagram showing a prediction engine comprising a neural network.

FIG. 7B shows an exemplary prediction engine 760 comprising at least one neural network 762. In any of the examples described herein, a prediction engine can be used in place of a neural network. The prediction engine may contain additional logic to determine how to interpret or act on the output of the neural network 762.

Example 16

Exemplary System Employing Series Processing and Veto Power

Figure 8:
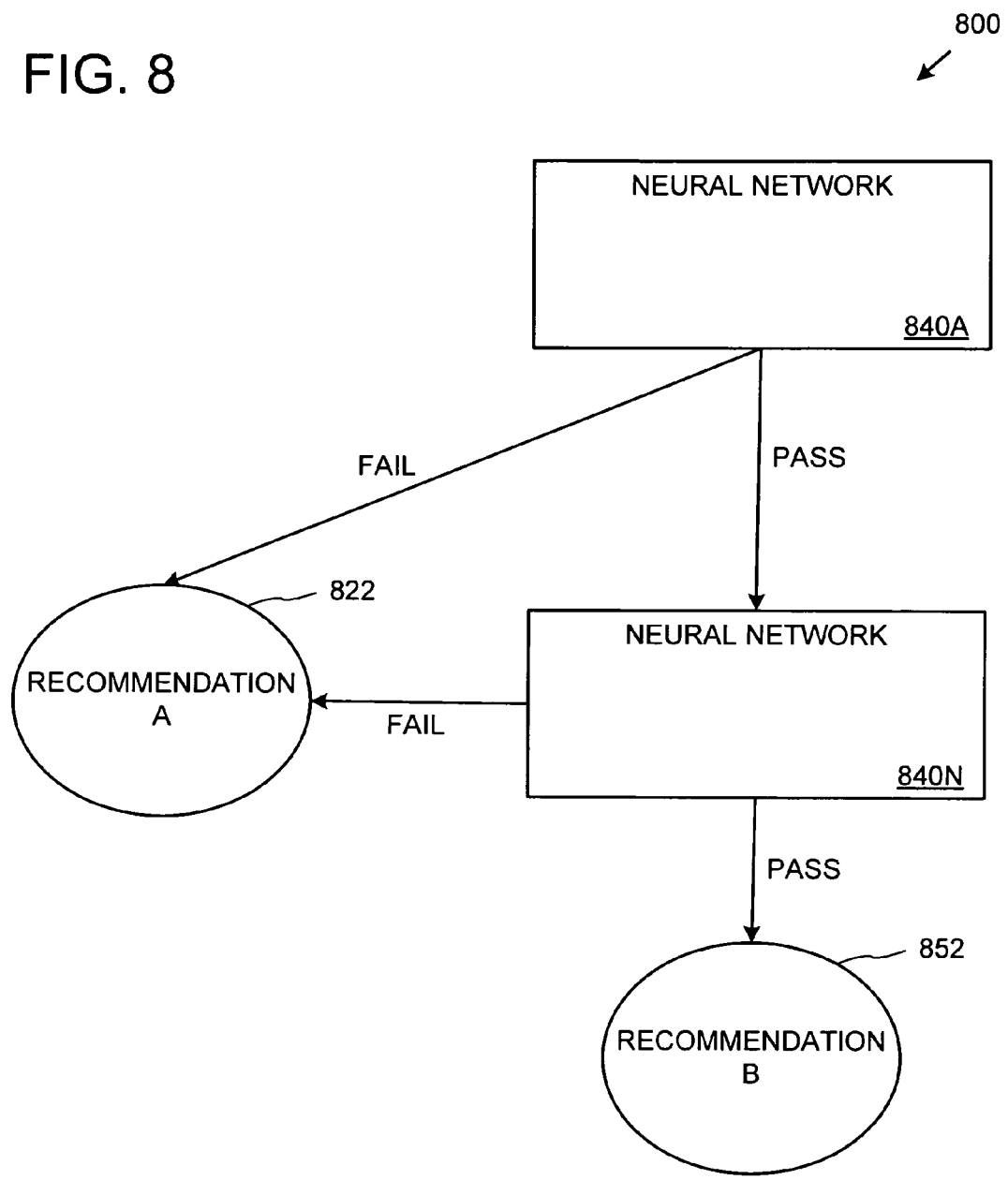
FIG. 8 is a block diagram showing an exemplary employee selection system for performing neural network processing in series.

FIG. 8 shows an exemplary employee selection system 800 that uses series processing by neural networks. In the example, a first neural network 840N (e.g., accepting one or more job performance predictive values for a candidate employee as input) generates a binary output (e.g., "pass" or "fail"). If the output is "fail," recommendation A (e.g., "no") is generated. If, however, the output is "pass," further processing is performed. In the example, a second neural network 840 (e.g., accepting one or more job performance predictive values for the candidate employee as input) generates a binary output (e.g., "pass" or "fail"). Again, if the output is "fail," recommendation A (e.g., "no") is generated. If, however, the output is "pass," the recommendation B (e.g., "yes") is generated. The recommendation can indicate whether to hire the candidate employee.

A similar system can be constructed using processing in parallel.

Example 17

Exemplary Implementation of Multi-Stage System Employing Series Processing and Veto Power An exemplary implementation of the system of FIG. 8 uses at least two neural networks 840A and 840N. The first neural network 840A can process candidate employee data as input and generate an n-ary output (e.g., "pass" or "fail"). In the event of an unfavorable output (e.g., "fail"), recommendation A 822 is provided, and further processing by the other neural network 840 is not performed.

In the event of a favorable output (e.g., "pass"), the second neural network 840N can process employee data as input and generate an n-ary output (e.g., "pass" or "fail"). In the event of an unfavorable output from the second neural network 840N, recommendation A 822 is provided. However, in the event of a favorable output from the second neural network 840N, recommendation B 852 is provided.

In this way, any of the networks 840A or 840N can exercise veto power over the recommendation. The multi-stage nature of the arrangement can be implemented in series as shown; however, an equivalent parallel approach can be implemented as well.

Figure 9:
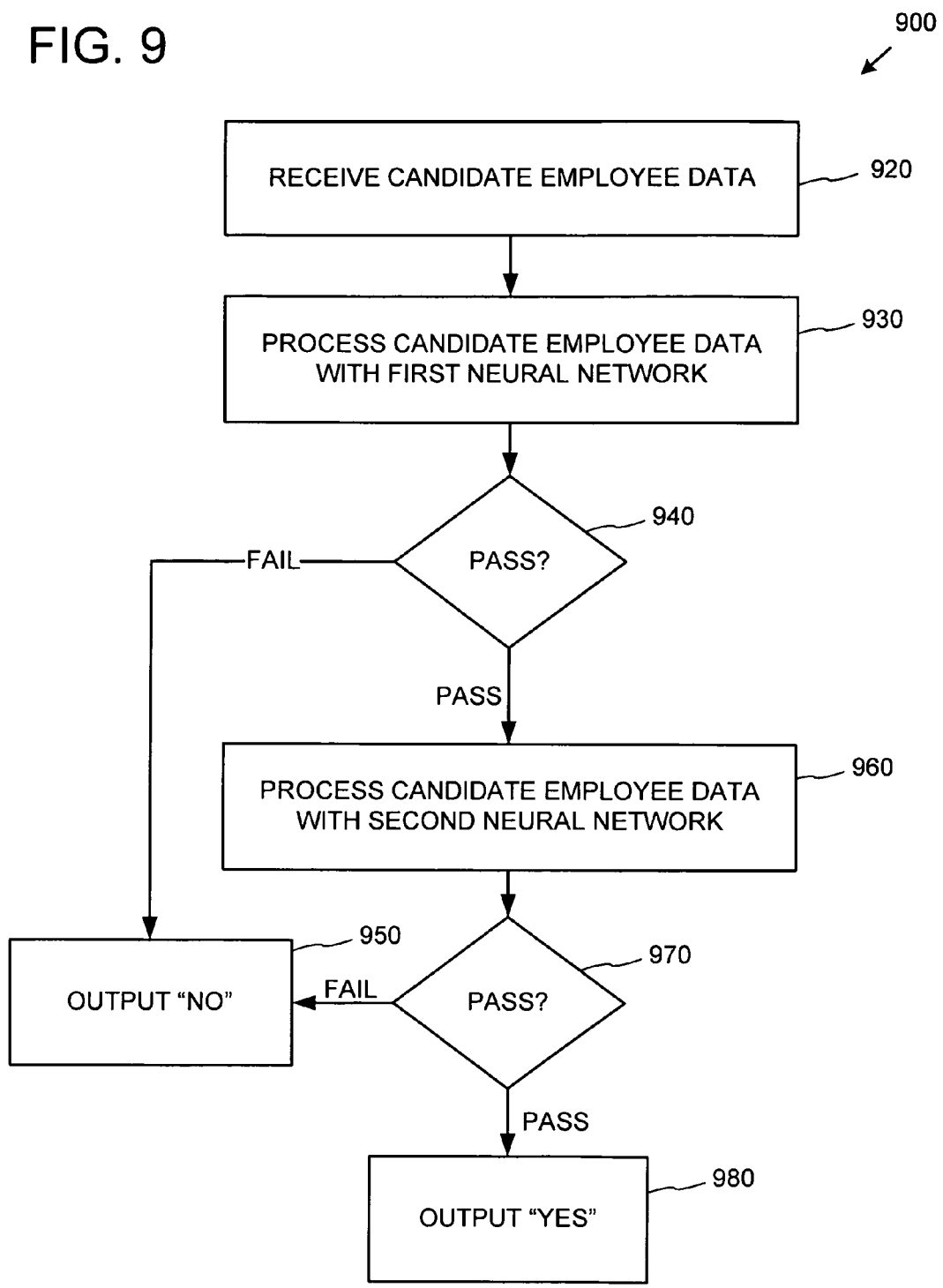
FIG. 9 is a flowchart showing an exemplary method for performing employee selection in series.

FIG. 9 shows an exemplary method 900 for performing employee selection in series and can be performed, for example, by a system such as that shown in FIG. 8. At 920, candidate employee data for a candidate employee is received.

At 930, the candidate employee data is processed with a first neural network.

At 940, it is determined whether the neural network provided a "pass" indication. If not, a "no" result is provided at 950. Otherwise, processing continues.

At 960, candidate employee data (e.g., not necessarily the same subset of predictive elements) is processed by a second neural network. At 970 it is determined whether the second neural network provided a "pass" indication. In not, a "no" result is provided at 950. Otherwise, a "yes" result is provided at 980.

In practice, instead of "yes" and "no" results, some other indication may be provided (e.g., "hire/do not hire"; "pass/fail", and the like).

Example 18

Exemplary Model Predicting Negative Termination Reason

An exemplary neural network for use in any of the examples described herein predicts whether a candidate will be terminated for a negative reason (e.g., involuntarily, for cause, or the like). Such a neural network can be constructed via training with data from former employees. Certain reasons for termination can be considered ambiguous and omitted from the analysis when training.

The neural network can base its prediction on similarity between the candidate employee and former employees who were terminated for negative reasons (e.g., as indicated by training the neural network). For example, input variables collected via or based on electronic employment applications can be used.

Example 19

Exemplary Model Predicting Length of Service

An exemplary neural network for use in any of the examples described herein predicts length of service for a candidate employee. Further processing can be done to determine whether the length of service meets (e.g., exceeds) a threshold length of service.

Example 20

Exemplary Other Models

Exemplary neural networks for use in any of the examples described herein can predict any of a variety of post-hire outcomes for a candidate employee. For example, sales productivity or probability of promotion can be predicted.

The technologies described herein are not limited to such described models. Any post-employment behavior (e.g., job performance measurement or outcome) that can be reliably measured (e.g., reduced to a numeric measurement) can be predicted. Examples include performance ratings by managers, performance ratings by customers, productivity measures, units produced, sales (e.g., dollar sales per hour, warrantee sales), call time, length of service, promotions, salary increases, probationary survival, theft, completion of training programs, accident rates, number of disciplinary incidents, number of absences, whether an applicant will be involuntarily terminated, and the like. It is anticipated that additional measurements will be developed in the future, and these can be embraced by the technologies described herein.

Example 21

Exemplary Combinations of Models

Any of the neural networks described herein can be used in combination with any of the neural networks described herein in any of the examples described herein. For example, in the system shown in FIG. 8, the first neural network can predict involuntary termination, and the second neural network can predict whether the candidate employee will have a length of service meeting a threshold length of service.

Example 22

Exemplary Implementation of Model Predicting Involuntary Termination

In any of the examples described herein, the following model predicting whether a candidate will be terminated for negative reasons can be used. A large database comprising completed employment applications and employment test results, along with payroll records (e.g., comprising hire date, termination date, and reason for termination) was assembled. Under the assumption that employees who had been fired for cause (e.g., absenteeism, misconduct, poor job performance, etc.) are less desirable than employees who quit voluntarily for other reasons, employee records were assigned to one of two categories as shown in Tables 1 and 2, below. Table 3 shows employee records with separation reasons that were ambiguous or unknown, which were dropped from the analysis.

TABLE 1

Termination: Good Reason

| Reason | Number of observations |
|---|---|
| Voluntary Resignation New Job | 15000 |
| Voluntary Resignation Education | 10246 |
| Voluntary Resignation Career Advance | 455 |

TABLE 2

Termination: Bad Reason

| Reason | Number of observations |
|---|---|
| Involuntary Tardiness | 369 |
| Involuntary Policy Violation | 1912 |
| Involuntary Performance | 930 |
| Involuntary Other | 288 |
| Involuntary No Show | 7419 |
| Involuntary Insubordination | 398 |
| Involuntary Dishonesty | 1893 |
| Involuntary Absenteeism | 2337 |

TABLE 3

Termination: Ambiguous Reason

| Reason | Number of observations |
|---|---|
| Missing | 0 |
| Voluntary Resignation Schedule | 822 |
| Voluntary Resignation Relocation | 1193 |
| Voluntary Resignation Pay | 534 |
| Voluntary Management Style | 247 |

Using the above data, feed forward neural networks (e.g., a radial basis function neural network) were trained to assign group membership to the records of former employees using their completed employment applications and test response data. The output of the trained neural networks indicated the most probable group membership (e.g., good vs. bad). These networks were tested on an independent set of records held out for testing purposes to evaluate the network's ability to apply learned pattern information to new records not used in development. Higher performing models were subjected to Equal Employment Opportunity compliance and other tests.

Figure 10:
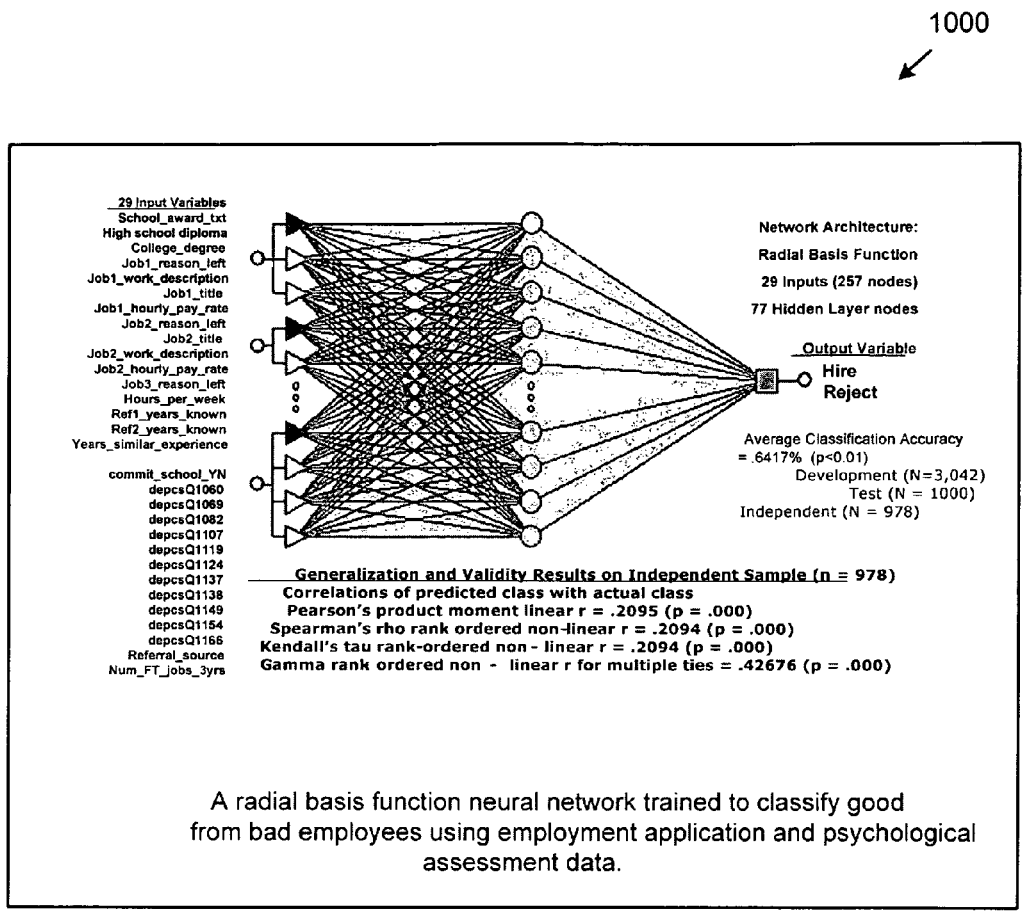
FIG. 10 is a block diagram shown an exemplary neural network predicting whether a candidate employee will be terminated for a negative reason.

An example of a deployable employee selection neural network 1000 trained to estimate risk of termination for cause is shown in FIG. 10. The model uses 18 input variables taken from completed electronic employment applications and 11 psychological assessment variables.

Exemplary variables taken from completed electronic employment applications include variables indicative of school awards, whether the candidate has a high school diploma, a college degree of the candidate, why the candidate left a former job, a job description of the candidate's former job, a job title of the candidate's former job, the pay rate (e.g., hourly) of the candidate's former job, how many hours the candidate wants to work (e.g., per week), how long a reference has known the candidate, how many years of experience (e.g., similar to the job being sought) the candidate has, whether the candidate can commit to schooling, a referral source for the candidate, and number of full time jobs (e.g., in the last three years) that the candidate has had. In the examples, the candidate's most recent former job is denoted by "job1." Other jobs are denoted by "job2," "job3," and so forth.

The hidden layer of the network has 79 processing nodes, and the output layer contains one node for the estimated group assignment. The network exhibited classifying about two out of three records correctly, well within the usable range for employee selection models, and shows no adverse impact against protected groups.

Example 23

Exemplary Implementation of Model Predicting Length of Service

In any of the examples described herein, the following model predicting length of service for a candidate employee can be used. The database described in Example 22 can be used for the model.

Figure 11:
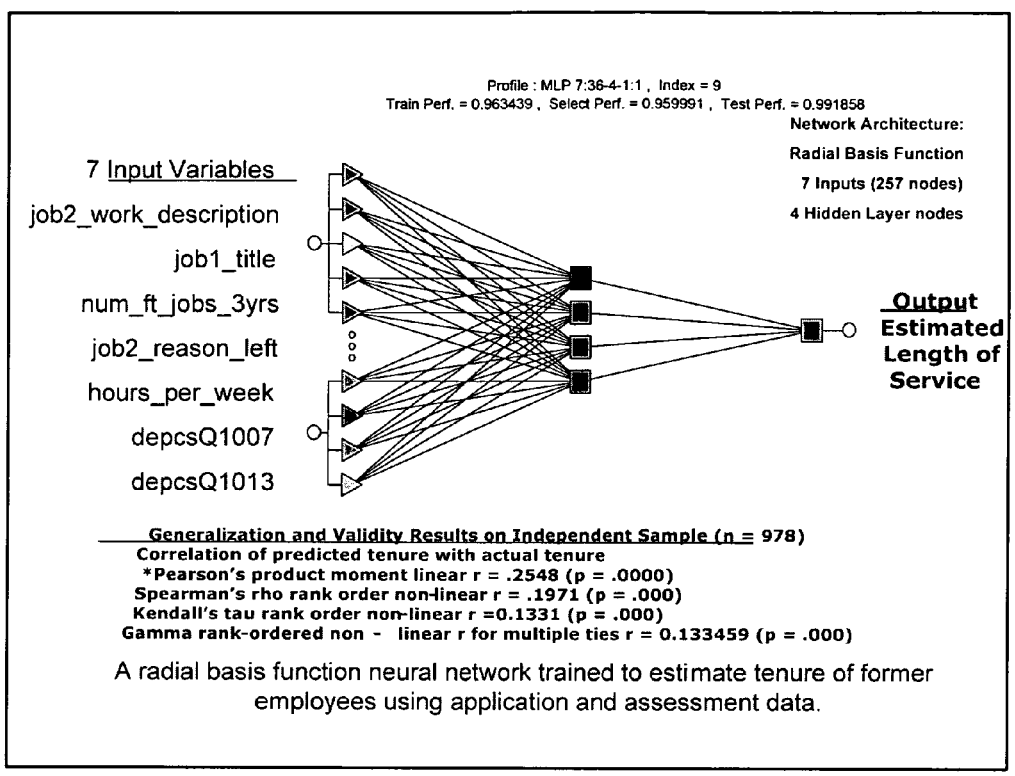
FIG. 11 is a block diagram showing an exemplary neural network predicting length of service.

The number of days on payroll (e.g., employee tenure) can be determined by subtracting termination date from hire date. A new set of neural networks were trained to estimate tenure, again using a subset of variables taken from the electronic employment application and assessment results of former employees hired (e.g., though the system). Following similar testing and refinement, several deployable networks can be developed. An exemplary deployable network 1100 is shown in FIG. 11.

In the example, five exemplary input variables are shown: variables indicative of a work description at a former job, a job title of a former job, number of full time jobs (e.g., in the past three years), a reason why the candidate left a former job, and number of hours (e.g., per week) desired by the applicant. Such input variables can be collected via electronic employment applications. In addition, two variables are psychological variables, which can also be collected via electronic employment applications or computed therefrom (e.g., by asking "I work with others well." and the like).

Example 24

Exemplary Combination of Neural Networks

The neural network of Example 22 and the neural network of Example 23 can be used together in a system or method. The two neural networks produce a different prediction about the probable post-employment outcomes associated with response patterns of applicants to the electronic employment application and pre-employment assessment.

If the first network estimates a high risk of termination for cause in the case of a specific applicant, that applicant can be identified as "not recommended for hire" as indicated by a RED score on the hiring report. Given the binary (e.g., dichotomous) output of the first model (good=consider for hire vs. bad=do not consider for hire), only applicants classified as "Good" are passed to the tenure estimator (e.g., an arrangement as shown in FIG. 8 can be adopted).

Rendered as software and embedded in the hiring management system, these two neural processors can function serially, although the multi-model employee selection neural networks can also be configured in a parallel design producing multiple predictive outputs simultaneously. In this example, however, the applicant data is processed first by the termination risk classifier. Applicants classified as most similar to bad former employees are assigned RED (do not consider for hire). Others are passed to the tenure estimator.

Applicant data passed to the tenure estimator can be processed by the second neural network which produces an estimate of likely tenure. Applicants showing response patterns most similar to former employees who worked only briefly (e.g., as determined by a threshold) are identified and scored using a variable cutoff threshold length of service and also flagged as RED (Do not hire). Applicant response patterns that survive both neural processors based on statistical similarity to former employees who separated for positive reasons after working with the company for a reasonable amount of time are recommended for hire as designated by a GREEN score flag.

In practice, thresholds can be implemented as an output score cutoff (e.g., a cut score). Such cutoffs can be chosen based on the judgment of the neural network developers. However, the threshold can be changed if desired (e.g., configured in software via a user interface) in light of the availability of applicants meeting the threshold. The threshold can serve as a screening mechanism to screen out those candidate employees not meeting the threshold.

Example 25

Exemplary Alternative Designs

In any of the examples described herein, design is not limited to sequential (e.g., serial) processing of candidate employee data as described in Example 24. Multi-model employee selection neural networks can also be deployed in parallel to produce estimates of multiple post-employment outcomes with a single pass of the data through the networks, the respective networks producing an output estimate of the same or different post-employment outcomes.

One method of reducing uncertainty in the estimation of post-employment outcomes in a multi-model scenario is neural network consensus groups. In such an arrangement, more than one neural network can be trained to predict the same post-hire outcome. A combination of the outputs of the models in the consensus group (e.g., averaging, voting, or the like) is used to determine the final prediction, which can be incorporated into or used as a basis for a hiring recommendation.

It is also possible to construct a parallel multi-model employee selection neural network to produce estimates of two or more different post-employment outcome predictions for applicants. Information flow of a parallel multi-model employee selection neural network trained to estimate tenure, involuntary termination code risk, sales productivity, and probability of promotion can be similar to that shown for FIG. 3 (but with four networks instead of two). Networks can take as input their respective input variables (e.g., assorted subsets of the total set of variables).

Example 26

Exemplary Techniques

Neural networks can be trained to predict future behavior of applicants based on observed relationships between applicant response patterns on employment application questionnaires and later on-the-job behavior metrics. More than one neural network can run in parallel or sequentially (e.g., in series) to estimate multiple post-employment outcomes.

In serial multi-model scenarios, two or more neural networks can process applicant data sequentially resulting in a hiring recommendation based on the combined predictions of the models.

In parallel consensus group design, multiple models can process applicant records in parallel (e.g., simultaneously or logically simultaneously), producing an estimate of the same post-employment outcome, in effect allowing multiple neural nets to vote for their output with majority rule dictating the final hiring recommendation.

Another parallel group design allows multiple models to process applicant records in parallel to produce two or more different post-employment outcome estimates.

Example 27

Exemplary Other Techniques

Any of the techniques described in Scarborough et al., U.S. patent application Ser. No. 09/922,197, filed Aug. 2, 2001, and published as US-2002-0 046 199-A1, which is hereby incorporated by reference herein, can be used in any of the examples described herein.

Example 28

Exemplary Candidate Employees

Although several of the examples describe a "candidate employee," such persons need not be candidates at the time their data is collected. Or, the person may be a candidate employee for a different job than that for which they are ultimately chosen.

Candidate employee information can come from a variety of sources. For example, an agency can collect information for a number of candidates and provide a placement service for a hiring entity. Or, the hiring entity may collect the information itself. Candidate employees can come from outside an organization, from within the organization (e.g., already be employed), or both. For example, an employee who is considered for a promotion can be a candidate employee.

Candidate employees are sometimes called "applicants," "job applicants," "job candidates," and the like.

Example 29

Exemplary Techniques for Constructing Neural Networks

Any of a variety of techniques can be used when constructing neural networks to predict any job performance outcome (e.g., those described herein or others) for a candidate employee. Using databases such as the ones described herein, training can proceed using input and output variables for present or former employees. The number of input variables can be reduced using feature selection techniques. Techniques can be employed to avoid overtraining, and models can be tested in a variety of ways (e.g., via a hold out data set).

The input variables for the trained model can accept input variables for candidate employees corresponding to those used during training. The trained network will output a prediction for the candidate employee based at least on data provided during training.

Example 30

Exemplary Computer-Readable Media

In any of the examples described herein, computer-readable media can take any of a variety of forms for storing electronic (e.g., digital) data (e.g., RAM, ROM, magnetic disk, CD-ROM, DVD-ROM, and the like).

The method 200 of FIG. 2, and any of the other methods shown in any of the examples described herein, can be performed entirely by software via computer-readable instructions stored in one or more computer-readable media. Fully automatic (e.g., no human intervention) or semi-automatic (e.g., some human intervention) can be supported.

Any of the models described herein can be implemented as computer-executable instructions stored in one or more computer-readable media. In practice, other information (e.g., data) can be included for use by the computer-executable instructions implementing the model.

Example 31

Exemplary Implementation of Systems and Methods

In any of the examples described herein, the systems and methods described can be implemented on a computer system. Such systems can include specialized hardware, or general-purpose computer systems (e.g., having one or more central processing units, such as a microprocessor) programmed via software to implement the system. For example, a combination of programs or software modules can be integrated into a stand alone system, or a network of computer systems can be used.

The technologies described herein can be provided to an end user over the Internet (e.g., via HTML pages or other Web interfaces). In addition, the technologies can be provided via dumb terminals or other network arrangements. For example, wireless devices, smart telephones, handheld devices, or a combination thereof can be used to collect candidate employee data, deliver hiring recommendations, or both.

Example 32

Exemplary Applications of Technology

In any of the examples described herein, the technologies described can be used to help promote desired outcomes within an organization. For example, an organization having an unusually high rate of involuntary termination can use a neural network predicting involuntary termination when selecting employees to avoid employees who will be involuntarily terminated. An organization having a problem with retention can use a neural network predicting length of service when selecting employees to reduce turnover and avoid employees who will quit early on. Use in various settings (hourly employees, salaried employees, commissioned employees, and the like) can be achieved.

Example 33

Exemplary Other Model Types

In any of the examples herein, in place of a neural network, any other model type can be used. For example, a regression model, probabilistic model (e.g., with a look up table), Bayesian model, classification tree, discriminant function, and the like can be used.

For example, any combination of two or more models of the same or different model types can be used to implement the technologies described herein.

Example 34

Exemplary Combinations

The technologies of any example described herein can be combined with the technologies of any one or more other examples described herein. For example, any of neural networks described herein can be used in a parallel or series arrangement.

ALTERNATIVES

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of my invention. Rather, we claim as our invention all such embodiments as may come within the scope and spirit of the following claims and equivalents thereto.

We claim:

1. A method comprising:
receiving one or more job performance predictive values for a candidate employee;
performing processing with at least a first neural network, wherein the first neural network generates a prediction indicating whether the candidate employee will be terminated for negative reasons, wherein the negative reasons comprise termination for cause;
performing processing with at least a second neural network, wherein the second neural network generates a prediction indicating a predicted length of service of the candidate employee; and
generating a hiring recommendation for the candidate employee based on the one or more job performance predictive values, wherein the hiring recommendation is based at least on the prediction indicating whether the candidate employee will be terminated for negative reasons according to the processing performed by the first neural network and the hiring recommendation is based at least on whether the predicted length of service meets a threshold length of service according to the processing performed by the second neural network.

2. The method of claim 1 wherein:
the hiring recommendation is based at least on an output of the first neural network and an output of the second neural network.

3. The method of claim 1 wherein:
the first neural network is coupled to the second neural network.

4. The method of claim 1 wherein:
at least one of the neural networks accepts at least one of the one or more job performance predictive values as input.

5. The method of claim 1 wherein:
the processing for the first neural network is performed in a first stage; and the processing for the second neural network is performed in a second stage.

6. The method of claim 5 wherein:
processing in the second stage is performed responsive to determining the candidate employee has survived the first stage.

7. The method of claim 5 wherein:
a positive hiring recommendation is provided for the candidate employee responsive to determining that the candidate employee has survived the stages.

8. The method of claim 1 wherein:
the processing for the first neural network is performed in parallel with the processing for the second neural network.

9. The method of claim 1 wherein:
the processing for the first neural network is performed in series with the processing for the second neural network.

10. The method of claim 1 wherein:
at least one of the neural networks outputs an n-ary value.

11. The method of claim 1 wherein:
the hiring recommendation comprises an n-ary value; and
the n-ary value is based at least on the processing performed by the first neural network and the processing performed by the second neural network.

12. The method of claim 11 wherein:
the n-ary value indicates whether or not to hire the candidate employee.

13. The method of claim 11 wherein:
the n-ary value comprises a binary value determined via voting by at least one of the neural networks.

14. The method of claim 13 wherein:
at least one of the neural networks is operable to exercise veto power over the binary value.

15. The method of claim 1 wherein:
the processing for the second neural network is performed responsive to determining a favorable outcome with the first neural network.

16. The method of claim 15 wherein:
the first neural network indicates the favorable outcome via an output indicator operable to indicate a binary value.

17. The method of claim 1 wherein at least two of the neural networks are members of a neural network consensus group.

18. The method of claim 1 wherein at least one of the neural networks comprises a neuro-fuzzy network.

19. One or more computer-readable storage media having computer-executable instructions for performing a method comprising:
receiving one or more job performance predictive values for a candidate employee;
performing processing with at least a first neural network, wherein the first neural network generates a prediction indicating whether the candidate employee will be terminated for negative reasons, wherein the negative reasons comprise termination for cause;
performing processing with at least a second neural network, wherein the second neural network generates a prediction indicating a predicted length of service of the candidate employee; and
generating a hiring recommendation for the candidate employee based on the one or more job performance predictive values, wherein the hiring recommendation is based at least on the prediction indicating whether the candidate employee will be terminated for negative reasons according to the processing performed by the first neural network and the hiring recommendation is based at least on whether the predicted length of service meets a threshold length of service according to the processing performed by the second neural network.

20. A method comprising:
receiving job application data for a candidate employee;
performing processing on the job application data of the candidate employee with at least a first neural network to generate a first output of the first neural networks wherein the first output indicates whether or not the candidate employee is predicted to be involuntarily terminated;
performing processing on the job application data of the candidate employee with at least a second neural network to generate a second output of the second neural network, wherein the second output indicates a predicted length of service for the candidate employee; and
indicating whether or not to select the candidate employee based on one or more job performance predictive values, wherein the indicating is based at least on the first output of the first neural network and the second output of the second neural network.

21. The method of claim 20 wherein the indicating is operable to generate an output indicating "hire."

22. A method comprising:
receiving a plurality of job performance predictive values for a candidate employee;
inputting one or more of the job performance predictive values to a first neural network operable to output a binary value indicative of whether the candidate employee is similar to former employees who were involuntarily terminated; and
inputting one or more of the job performance predictive values to a second neural network operable to output a value indicative of predicted length of service; and
generating a binary value indicating whether to hire the candidate employee based at least on whether the first neural network indicates whether the candidate employee is similar to former employees who were involuntarily terminated and whether or not the second neural network indicates that the predicted length of service is at least a threshold value.

23. The method of claim 22 wherein the second neural network processes the one or more of the job performance predictive values only if the first neural network indicates that the candidate employee is not similar to former employees who were involuntarily terminated.

24. One or more computer-readable storage media comprising:
a hiring recommendation generator operable to generate a hiring recommendation, wherein the hiring generator comprises:
a first neural network, wherein the first neural network is configured to predict involuntary termination; and
a second neural network, wherein the second neural network is configured to predict length of service;
wherein the hiring recommendation is based at least on processing performed by the first neural network and the second neural network.

25. The one or more computer readable media of claim 24 wherein:
the hiring recommendation comprises a binary value indicative of whether or not to hire a candidate employee; and
the binary value is based at least on processing performed by the first neural network and processing performed by the second neural network.

26. The one or more computer readable media of claim 24 wherein:

the first neural network is operable to accept input data indicative of a candidate employee and operable to output a first value indicating predicted performance of the candidate employee if the candidate employee were to be hired; and a second neural network operable to accept input data indicative of the candidate employee and operable to output a second value indicating predicted performance of the candidate employee if the candidate employee were to be hired;

wherein the hiring recommendation is based at least on the output of the first neural network and the output of the second neural network.

27. An apparatus comprising:

means for generating a hiring recommendation for a candidate employee, wherein the means for generating the hiring recommendation comprises:

means for generating a first output indicative of whether the candidate employee is predicted to be involuntarily terminated; and means for generating a second output indicative of whether the candidate employee is predicted to have a length of service exceeding a threshold;

wherein the hiring recommendation is based at least on the first output and the second output.

28. A method comprising:

receiving one or more job performance predictive values for a candidate employee;

performing processing with at least a first model configured to predict whether the candidate employee will be involuntarily terminated;

performing processing with at least a second model configured to predict length of service for the candidate employee; and generating a hiring recommendation for the candidate employee based on the one or more job performance predictive values, wherein the hiring recommendation is based at least on the processing performed by the first model and the processing performed by the second model;

wherein the first and second models are selected from the group consisting of:

a neural network, a regression model, a probabilistic model, a Bayesian model, a classification tree, and a discriminant function.

29. The method of claim 1 further comprising:

performing processing with an additional neural network, wherein the additional neural network generates a prediction indicating predicted sales of the candidate employee;

wherein the hiring recommendation is based on predicted sales of the candidate employee according to the processing performed by the additional neural network.

30. The method of claim 1 further comprising:

performing processing with an additional neural network, wherein the additional neural network generates a prediction indicating a predicted accident rate of the candidate employee;

wherein the hiring recommendation is based on the predicted accident rate of the candidate employee according to the processing performed by the additional neural network.

31. The method of claim 1 further comprising:

performing processing with an additional neural network, wherein the additional neural network generates a prediction indicating predicted promotions of the candidate employee;

wherein the hiring recommendation is based on predicted promotions of the candidate employee according to the processing performed by the additional neural network.

* * * * *